United States Patent Office 3,397,569
Patented Aug. 20, 1968

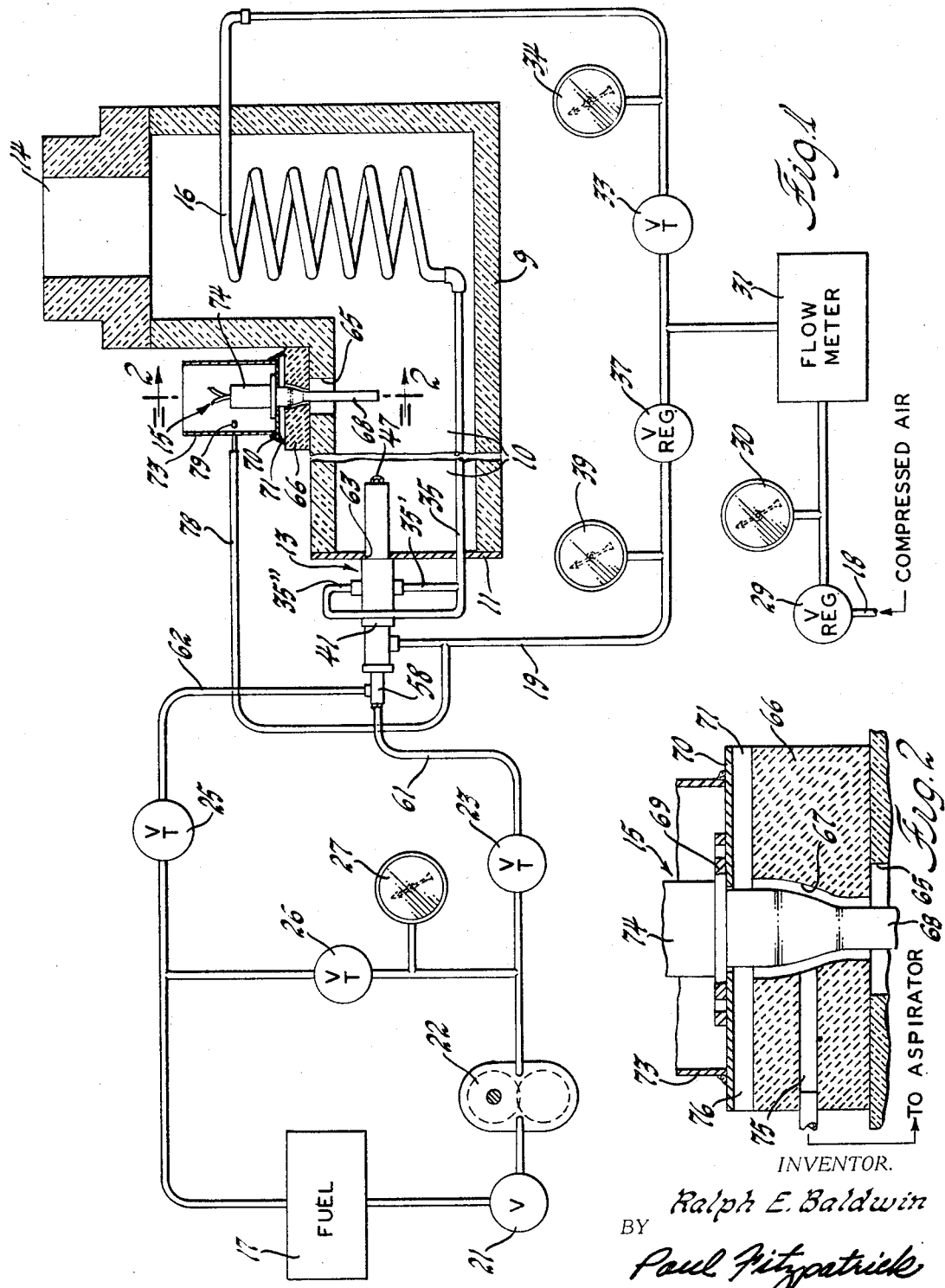

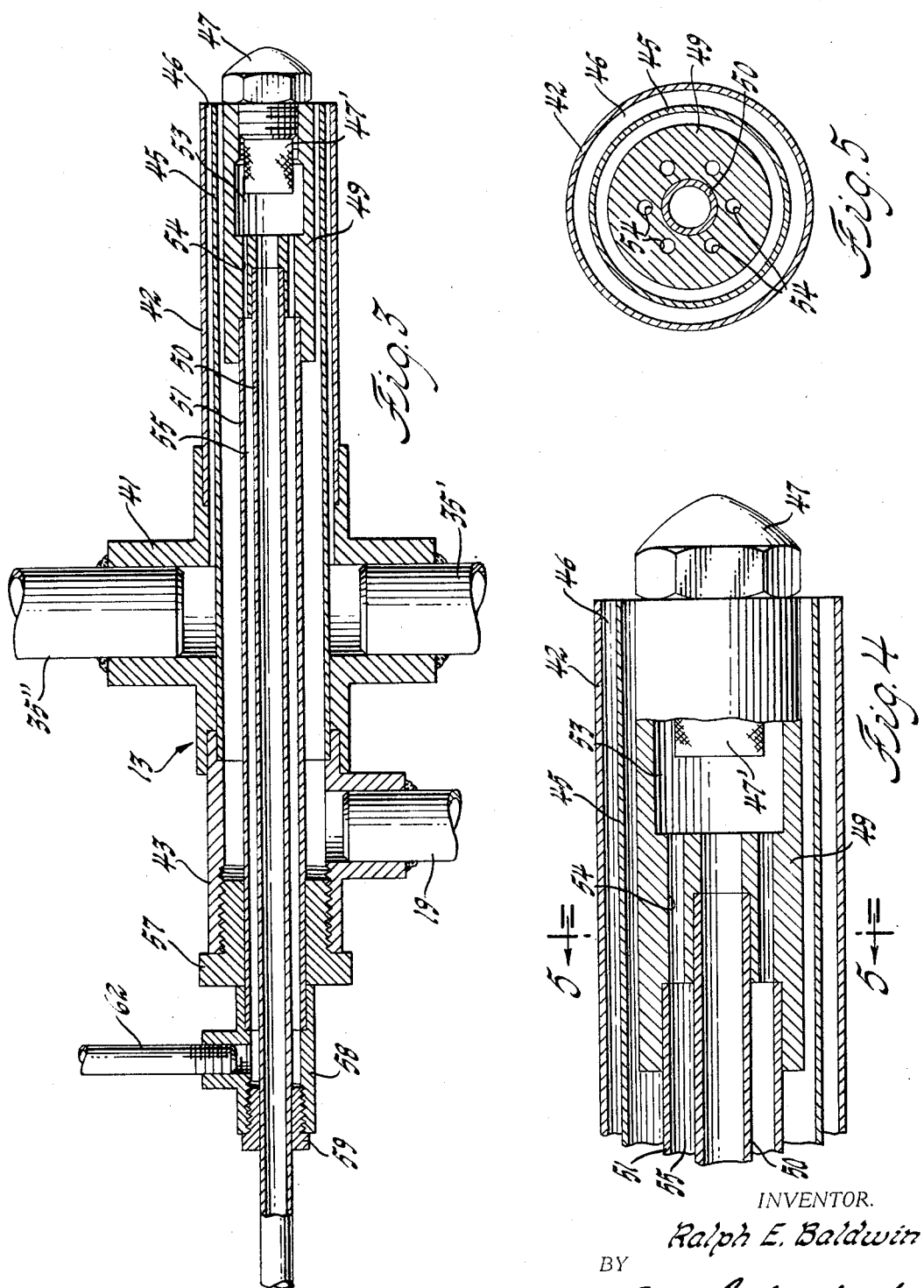

3,397,569
FURNACE AND BURNER FOR TESTING
TEMPERATURE PROBES
Ralph E. Baldwin, Indianapolis, Ind., assignor to General
Motors Corporation, Detroit, Mich., a corporation of
Delaware
Filed Oct. 22, 1965, Ser. No. 501,681
6 Claims. (Cl. 73—1)

ABSTRACT OF THE DISCLOSURE

A furnace for testing thermocouples at very high temperatures under simulated operating conditions includes a kiln fired by oil fuel of the sort used in gas turbines. A very hot flame is achieved by supplying combustion air to the nozzle through a heater in the path of the flame downstream of the thermocouple. Fuel entering the nozzle is cooled by a return conduit for excess fuel and a conduit for cool compressed air disposed between the fuel entry pipe and the hot air duct. Cool air is circulated around the parts of the thermocouple remote from the temperature sensing tip.

One aspect of the development of gas turbine engines to operate at higher temperatures and greater efficiency lies in the development of thermocouples or other temperature measuring devices able to withstand temperatures well over 2000° F.

My invention is directed primarily to the provision of a burner which can be used as a test rig for thermocouples under conditions which simulate those in high temperature fuel burning engines, and which is capable of attaining temperatures as high as 3575° F. The invention is not limited to such use, however.

It is easy to obtain a very hot flame, but not easy to attain very high temperatures while burning hydrocarbon fuels of the sort used in gas turbines. Successful endurance testing and qualification of thermocouples for high temperature service can only be done in combustion products of the sort to which they are exposed in service. The thermocouple testing furnace which I have devised will reach temperatures over 3500° F. and successfully test gas turbine thermocouples at these extremely high temperatures because of several significant features.

Very high temperatures are attained largely because the major part of the combustion air is brought to a high temperature by recuperative heating from the testing flame. The use of this hot air for combustion underlies the need for fuel nozzle cooling. The fuel nozzle is of a recirculating type so that it is partially fuel-cooled and also has provision for shielding or cooling the fuel passages by a flow of cool air. The test setup of the furnace also embodies means for cooling the portions of the thermocouple or probe which normally are external to or adjacent the wall of the engine or other hot gas duct when the thermocouple is in service.

The nature of my invention and the various novel features thereof may be appreciated from the succeeding detailed description of the preferred embodiment of the invention and the accompanying drawings thereof in which:

FIGURE 1 is a sectional view of the testing furnace with a schematic diagram of the fuel and air circuits.

FIGURE 2 is a fragmentary cross-section of the furnace taken on the plane indicated in FIGURE 1.

FIGURE 3 is a longitudinal section of the fuel nozzle assembly.

FIGURE 4 is an enlarged view of the tip portion of the nozzle assembly.

FIGURE 5 is a cross-section taken on the plane indicated in FIGURE 4.

Referring first to FIGURE 1, the furnace 9 comprises a kiln-like structure of high temperature refractory brick defining a passage 10 extending from a plate 11 in which a fuel nozzle assembly 13 is mounted to a chimney or hot air outlet 14. As will be seen, the furnace is L-shaped in the section illustrated. The thermocouple or probe 15 is mounted in the horizontal part of the passage 10 at a distance of the order of 6 to 12 inches from the burner to be in the hottest part of the flame. An air heating coil 16 is mounted downstream of the thermocouple in the path of the hot gas from the burner.

The nozzle assembly 13 is supplied with fuel (ordinarily JP–4) from a tank 17 and with compressed air from a source indicated by the line 18. Part of the compressed air is supplied through the coil 16 so that it is brought to about 2000° F. by the flame before entering the nozzle assembly and part of the air is preferably supplied to the nozzle assembly through a line 19 so that it flows as cool air through the nozzle, lessening heating of the fuel by the hot combustion air.

Considering the means for supplying the fuel and air, the fuel is supplied from the tank 17 through a shutoff valve 21 to a suitably driven pump 22. The pump circulates the fuel through a throttling valve 23, the nozzle assembly 13, and a throttling valve 25 in the return line back to the tank 17. A third throttling valve 26 may be provided as a bypass for excess fuel from the pump to the tank. Instrumentation may include a pressure gauge 27 in the pump outlet. Elements such as filters and a relief valve (not illustrated) may be provided, and other arrangements for controlling the flow of fuel to and from the nozzle may be used if desired. However, the arrangement of throttling valves shown provides for easy adjustment of the fuel.

The air supplied through line 18 from a suitable source of compressed air passes through a settable regulating valve 29 which maintains a constant downstream pressure indicated by the gauge 30. A flow meter 31 may be provided to indicate the air flow. The main combustion air flow is controlled by throttling valve 33 and its pressure is indicated by gauge 34. This air is conducted to and through the heating coil 16 and a hot air line 35 which divides into two branches 35' and 35" entering the nozzle assembly 13 at opposite sides of a diameter (see FIGURE 3). A branch compressed air line runs from the flow meter through a second settable pressure regulating valve 37 to supply cooling air through line 19 to the nozzle assembly 13. A gauge 39 may be provided to indicate cooling air pressure.

FIGURES 3 to 5 illustrate the preferred nozzle assembly 13. It comprises a T 41 into which the hot air pipes 35' and 35" are welded. The T 41 abuts the plate 11 at the front end of the furnace and a stainless steel tube 42 extends from it into the furnace. A smaller T 43 welded to the outer end of T 41 receives the cool air line 19. A stainless steel tube 45 welded in the T 43 extends concentrically through tube 42 so that these define between them an annular passage 46 for the hot combustion air. The fuel is sprayed by a commercial spray tip 47 of the type used in domestic oil furnaces which is threaded into a cylindrical fitting 49. I prefer a "Monarch" F–80 tip rated at two gallons per hour and 80° cone angle. Concentric fuel supply and return tubes 50 and 51 are welded into the fitting 49. Tube 50 communicates directly with the chamber 53 from which the fuel flows into the filter 47' of the spray nozzle or tip 47. A number of parallel bores 54 in the fitting 49 connect the chamber 53 with the fuel return passage 55 defined between the tubes 50 and 51. The outer or left-hand end of tube 51 is brazed or welded into a drilled plug 57 which threads into the T 43, and is also brazed into a small T 58, the outer end of which is closed by a drilled plug 59. The tube 51, fitting 49, and spray tip 47 are thus supported by the plug 57 in the main body of the nozzle assembly defined by T's 41 and 43. Tube 50 is supported in the fitting 49 and in the plug 59. The outer end of tube 50 is connected by any suitable fitting (not illustrated) to a line 61 supplying the fuel to the nozzle. The fuel return line 62 is threaded into the side branch of T 58. By controlling the flow into and out of the nozzle assemblies by valves 23, 25, and 26, or any other suitable control mechanism, the fuel flow into the furnace can be accurately controlled to determine the temperature generated in the furnace. The nozzle assembly may be supported by the piping and by being inserted into hole 63 in the front plate 11 of the furnace.

The preferred means for supporting the thermocouple and for cooling the body of the thermocouple are shown in FIGURES 1 and 2. An opening 65 in the top fire brick wall of the furnace 9 is partially closed by a refractory block 66 which may simply rest on the top of the furnace. Block 66 has an opening 67 through which the probe portion 68 of the thermocouple 15 extends into the furnace. The usual mounting flange 69 of the thermocouple rests on a metal plate 70 which has flanges 71 resting on the upper surface of block 66. A cylinder 73 fixed upon the plate 70 encloses the body portion 74 of the thermocouple. A passage 75 extending horizontally from the opening 67 is connected to an aspirator or suction pump (not illustrated) which draws air from the opening 75. By this means, ambient air is drawn into the space 76 between plate 70 and block 66 and downward through the upper part of hole 67, thus keeping the upper part of the probe relatively cool. Any hot air which rises from the furnace through the lower portion of probe mounting hole 67 is exhausted through the outlet 75 and kept away from the outer part of the probe. The body of the thermocouple may also be cooled by a supply of fresh air into the interior of cylinder 73. As illustrated, a branch pipe or hose 78 extends from the cold compressed air line 38 to a more or less tangential entry nozzle 79. The air so supplied circulates within the cylinder 73 and exhausts through the open top of the cylinder. It will thus be seen that means are provided to keep the part of the thermocouple which normally is external to the hot zone of the engine relatively cool.

The operation of the furnace is quite simple. The air supply to the nozzle is turned on and then the fuel supply is initiated and ignited by any suitable means (not illustrated). The fuel and air can be adjusted for complete combustion and, as the combustion products heat the coil 16, the combustion air becomes progressively hotter and ultimately the recuperative effect is capable of bringing the flame temperature to 3500 to 3600°. This compares with about 2200° F. which can be reached without the recuperator. At full temperature operation, the combustion air supplied through coil 16 is at about 1400°. In operation, the maximum temperature is reached just before increase of air lowers the flame temperature. The flame can, of course, be maintained at lower values of temperature by decreasing the fuel.

The high temperature to which the nozzle assembly is exposed makes cooling necessary. The circulation of considerable excess fuel and returning this fuel through the outer of the two conduits which connect to the spray tip prevents undue heating and consequent vaporization or coking of the fuel. Either of these effects would prevent proper flow from the spray tip. In general, it is also quite desirable to utilize the flow of cooling air between the hot combustion air and the fuel, and such air may be supplied as needed under pressure. I have found, however, that the hot air flowing from the annular conduit 46 will aspirate a considerable quantity of cooling air through the T 43 if the air supply pipe 19 is omitted. This is satisfactory under some operating conditions.

The fuel sprayed by the tip into the annular sheet of quite hot air issuing from the nozzle assembly results in a very intense and hot flame. The temperature of the flame is calibrated by using a thermocouple the junction of which is iridium and 60% iridium-40% rhodium. Optical pyrometers have also been used to check the temperature attained by the burner.

Ordinarily, a thermocouple or other probe intended for use in high temperatures has a probe which can withstand such temperatures, but the body or ahead of the thermocouple ordinarily is less resistant to extreme heat. It will be seen that the arrangement to draw cooling air in through the thermocouple mount around the probe 68 and between the supporting block and the plate 70 on which the thermocouple rests, as well as the circulation of cooling air within the cylinder 73, all provide a relatively cool environment for the body of the thermocouple. Any combustion products flowing out of the furnace through the opening 67 will also be drawn off by the aspirator after mixing with the cool ambient air.

It may also be repeated that the ability of the high temperature furnace to use jet engine fuel such as kerosene or JP–4 is highly important, as it makes it possible to duplicate the chemical constitution of gas turbine or jet engine combustion products and thus test the thermocouples in a realistic environment.

The detailed description of the preferred embodiment of the invention for the purpose of explaining the principles thereof is not to be considered as limiting or restricting the invention, since many modifications may be made by the exercise of skill in the art.

I claim:
1. An apparatus for testing temperature probes and the like at high temperatures under conditions simulating use in engines comprising, in combination,
   a furnace defining a passage,
   a fuel nozzle including a fuel spray tip mounted adjacent one end of the passage,
   means on the furnace for mounting a probe to be tested so as to enter a zone of hot flame in the passage downstream from the nozzle,
   an air heating coil in the passage further downstream from the nozzle than the mounting means,
   means for conducting fuel under pressure to the spray tip through the nozzle, and
   means for supplying combustion air under pressure through the heating coil to the nozzle,
   the nozzle including a hot air conduit discharging the combustion air in a sheath around the spray tip.
2. An apparatus as recited in claim 1 including
   means for returning excess fuel from the spray tip through the nozzle enclosing the fuel conducting means,
3. An apparatus as recited in claim 2 including
   means for supplying relatively cool air under pressure to the nozzle and
   means for flowing the cool air through the nozzle between the hot air conduit and the fuel returning means.
4. An apparatus as recited in claim 3,
   the probe mounting means comprising a block of refractory insulating material and a support plate spaced from the outer surface of the block, the block and plate having aligned openings,
   the probe extending from the outer surface of the plate through the aligned openings in the plate and the block into the passage, and
   means for drawing air from an intermediate portion of the opening in the block so as to cause cool ambient air to flow between the plate and the block and flow into the opening in the block around the prob.
5. An apparatus as recited in claim 1,
   the probe mounting means comprising a block of refractory insulating material and a support plate spaced from the outer surface of the block, the block and plate having aligned openings, the probe extending from the outer surface of the plate through the aligned openings in the plate and the block into the passage, and means for drawing air from an intermediate portion of the opening in the block so as to cause cool ambient air to flow between the plate and the block and flow into the opening in the block around the probe.

6. An apparatus as recited in claim 1 in combination with means for supplying a hydrocarbon fuel to the fuel conducting means.

References Cited

UNITED STATES PATENTS

| 422,222 | 2/1890 | Jennings | 239—424 X |
| 2,549,092 | 4/1951 | Huber | 158—73 X |

FOREIGN PATENTS

| 21,675 | 1907 | Great Britain. |
| 453,148 | 9/1936 | Great Britain. |

DAVID SCHONBERG, *Primary Examiner.*

S. CLEMENT SWISHER, *Assistant Examiner.*